UNITED STATES PATENT OFFICE.

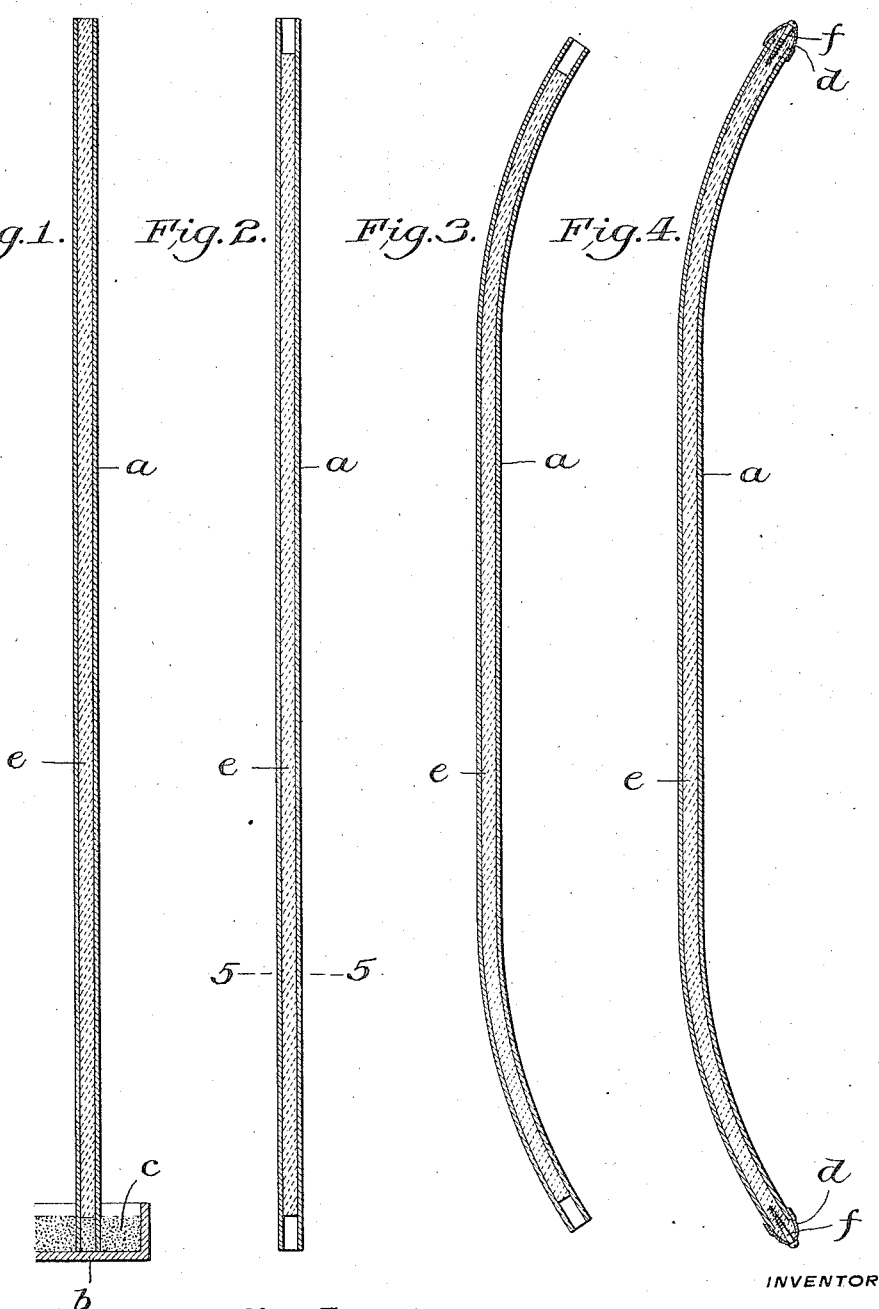

ROLLIE B. FAGEOL, OF PHILADELPHIA, PENNSYLVANIA.

MANUFACTURE OF FILLED AND BENT TUBING.

1,189,675.      Specification of Letters Patent.      Patented July 4, 1916.

Application filed September 5, 1911. Serial No. 647,542.

*To all whom it may concern:*

Be it known that I, ROLLIE B. FAGEOL, a citizen of the United States, residing at Philadelphia, in the county of Philadelphia and State of Pennsylvania, have invented certain new and useful Improvements in the Manufacture of Filled and Bent Tubing, of which the following is a specification.

The object of my invention is to provide a novel, filled, bent, metal tube having strong and durable characteristics, and a novel process of manufacturing the same.

The invention or product of the process is primarily adapted for use in providing a strong and durable bumper bar for extension across the front of an automobile, although, obviously, the invention may be put to various other uses.

The novel and characteristic features of my invention will be fully described in the following specification and particularly pointed out in the appended claims.

In the drawings: Figures 1, 2, 3 and 4 are longitudinal sections through the center of the tube showing various steps in the manufacture thereof. Fig. 5 is a transverse section on line 5—5 of Fig. 2.

In the drawings I have illustrated various steps in the performance of my improved process of manufacturing filled, bent, metal tubes to be used as bumper bars for automobiles, but it will be readily understood from the process hereinafter described that the tubes may be bent into any desired form for any desired purpose.

In the manufacture of the bumper bars just mentioned I first cut a metal tube $a$ of a suitable diameter into the desired length for the bumper bar. I then place the length of tube in a vertical position with its lower end resting on a suitable support $b$ and embedded in a quantity of sand $c$ which fills the lower end of the tube for a short distance from the bottom thereof, as shown in Fig. 1. The sand supports the cement so that the latter will harden and set a short distance inwardly of the end of the tube and enable me to attach the end caps or otherwise finish the ends of the tube as hereinafter set forth. While the tube $a$ rests in vertical position on the support $b$, I pour a fluid cement into the upper end of the tube until the tube is filled or substantially filled with the cement, as shown in Fig. 1.

The cement just mentioned, is a suitable compound consisting of compound aggregates, such as crushed rock or sand or both, a suitable cement, such as Portland cement, and water combined in such proportions as to produce a composition which will flow and which will set and harden when dried. I have found that a cement consisting of crushed rock, sand and Portland cement in substantially equal proportions with twenty per cent. of water will dry into a hard, non-flexible condition and give very good results as the cement $e$ for filling the tube $a$, as previously described.

After the cement $e$ has been introduced to the tube $a$, as shown in Fig. 1, the cement is permitted to dry in the atmosphere until it assumes a thick plastic condition, but not until the cement hardens. During this first drying period the cement shrinks from the upper end of the tube a distance about equal to the distance the sand $c$ extends into the lower end of the tube. This being done, the tube $a$ is removed from the sand $c$ and the condition of the tube $a$ and cement $e$ appears, as shown in Fig. 2.

At the close of the first drying period, as just mentioned, the cement $e$ is plastic enough to permit the tube $a$ to be bent, and the cement is thick enough and strong enough to prevent the tube $a$ from collapsing or being indented during the bending operation. Therefore, while the cement $e$ is in this condition, the ends of the tube $a$ are bent into the condition shown in Fig. 3, by any suitable power and by any suitable devices, the cement $e$ supporting the wall of the tube $a$ and maintaining it in its round condition in transverse sections, as shown in Fig. 5, during the bending operation. After the tube has been bent, as desired, the cement is permitted to dry within the bent tube until the cement hardens thereby producing an exceedingly strong and durable bar of the desired configuration. The bar is strong enough to be put into use after the cement has dried for a period of about two weeks, but the bar does not attain its full strength until the cement has dried for a period of about three months.

After the tube $a$ has been bent, as shown in Fig. 3, I fill each end of the tube with a quantity of a cement, preferably consisting of equal parts of sand and Portland cement with fifteen per cent. of water. I then place metal caps $d$ over the ends of the tube, the caps $d$ having parts $f$, preferably screws, connected thereto and extending into the cement placed within the ends of the tube. The added cement engaged with the screws $f$ is then permitted to dry and harden, thereby firmly holding the screws $f$ and caps $d$ in place upon the ends of the tube $a$.

In the broad aspect of my invention any suitable composition which will assume a plastic condition strong enough to support the tube while bending and which will harden within the bent tube may be employed in lieu of the cement described herein.

I claim:

1. The process of producing a reinforced buffer bar for automobile bumpers having curved end portions provided with protective caps, consisting in filling a thin metal tube with a non-adhesive insoluble substance extending from one extremity of the tube to a point a slight distance inwardly thereof, then filling the remainder of the tube with a plastic composition and exposing the same to atmospheric action to permit the composition to harden, the plastic composition shrinking from the unclosed end of the tube during the hardening stage, then removing the insoluble substance from the tube, then bending the tube in proximity to each of its ends while the plastic composition is in a semi-hardened state, then permitting the plastic composition to harden to render the tube non-flexible, then filling the open ends of the tube with cement and then applying to the ends of the tube the protective caps by embedding a portion of each cap in the cement within the contiguous end of the tube and then permitting the cement to harden.

2. The process of producing a reinforced buffer bar for automobile bumpers consisting in filling a thin metal tube with a plastic composition and exposing the same to atmospheric action to permit the composition to harden, then shaping the tube by a bending operation while the plastic composition is in a semi-hardened state, then permitting the plastic composition to harden to render the tube non-flexible and then applying closures to the ends of the tube.

In testimony whereof I affix my signature in presence of two witnesses.

ROLLIE B. FAGEOL.

Witnesses:
S. I. HARPER,
A. V. GROUPE.